No. 830,686. PATENTED SEPT. 11, 1906.
J. J. TARTT.
TROLLEY POLE CONTROLLER.
APPLICATION FILED DEC. 28, 1903.
5 SHEETS—SHEET 1.
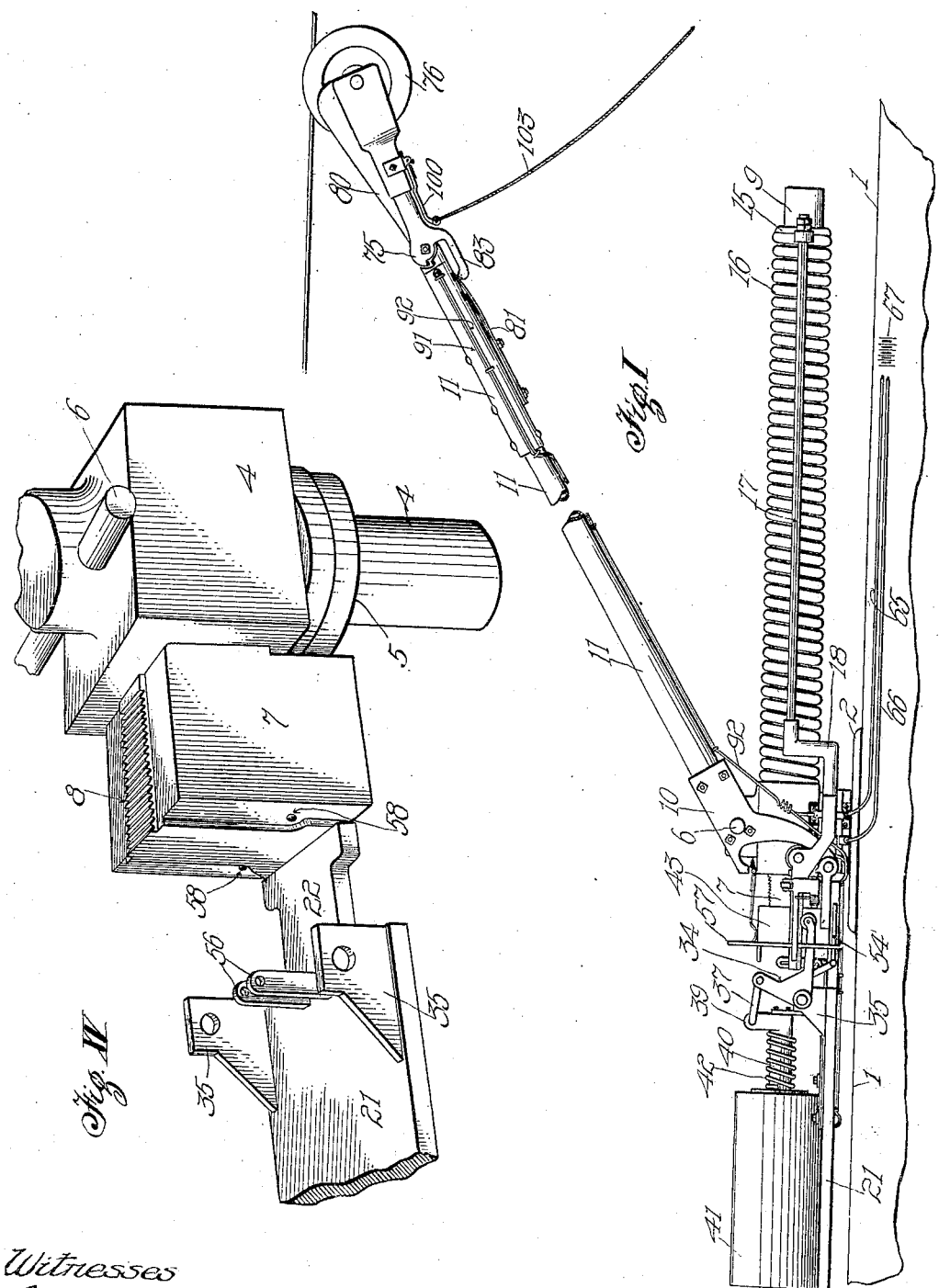
Witnesses
Inventor
John J. Tartt
by Townsend & Son
Attys

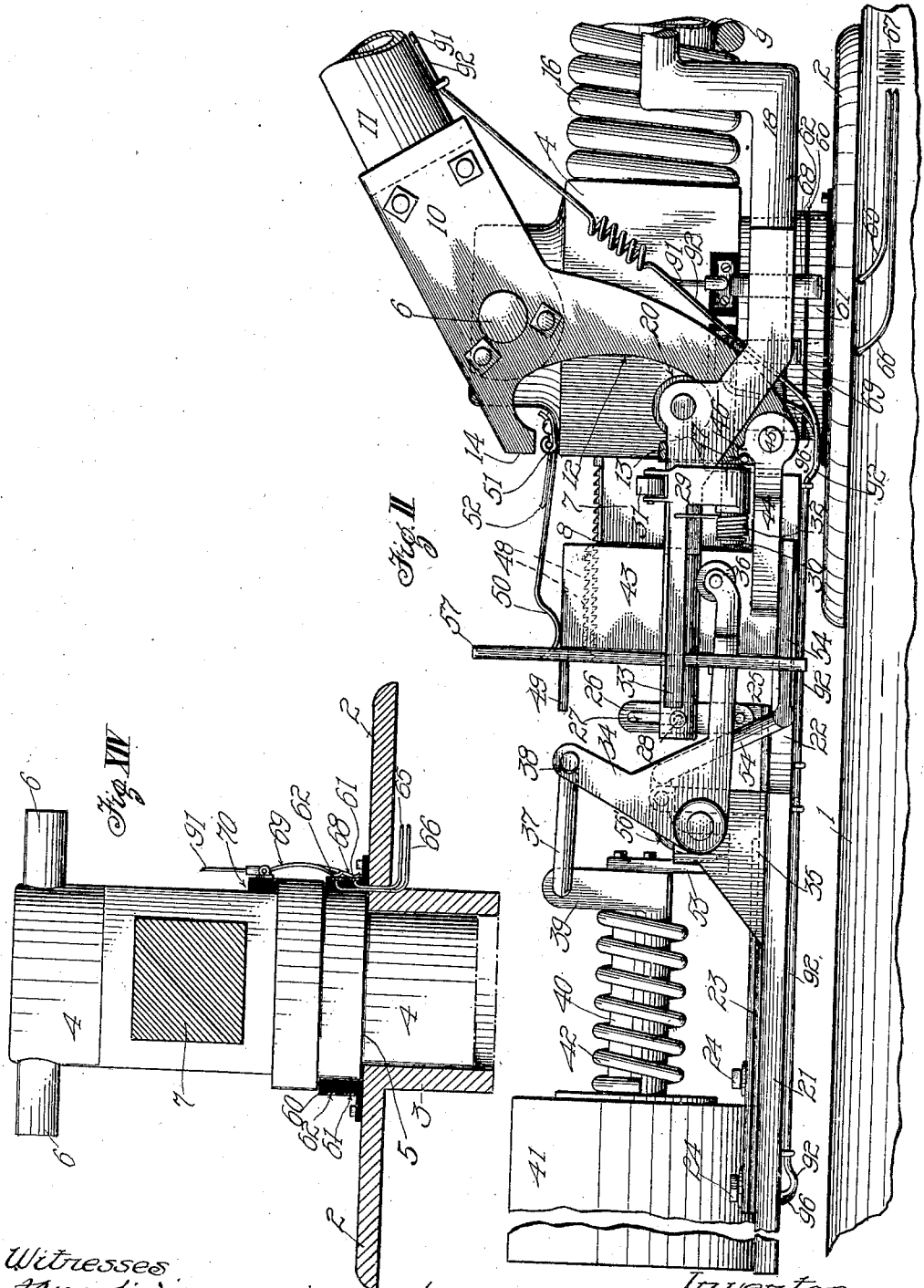

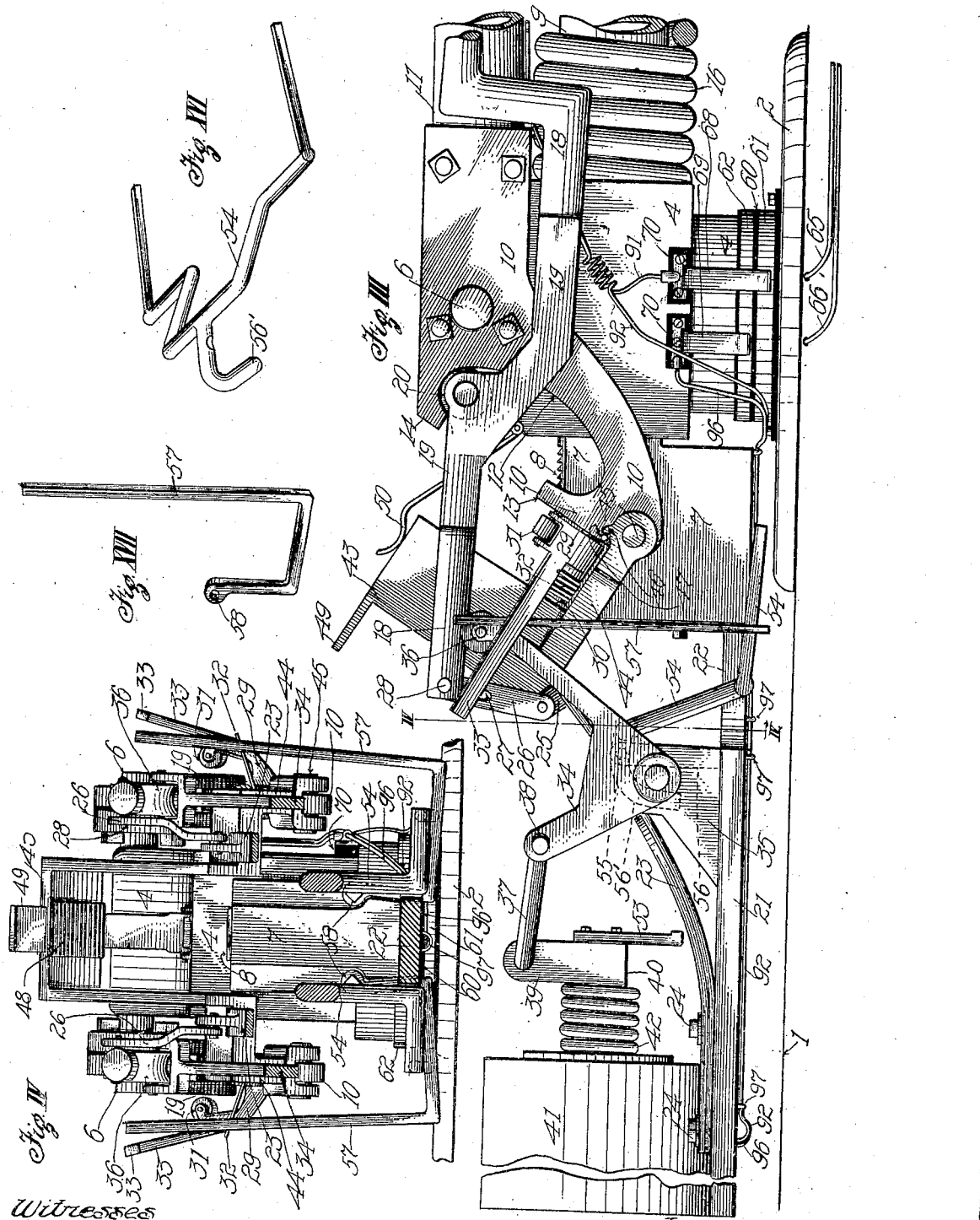

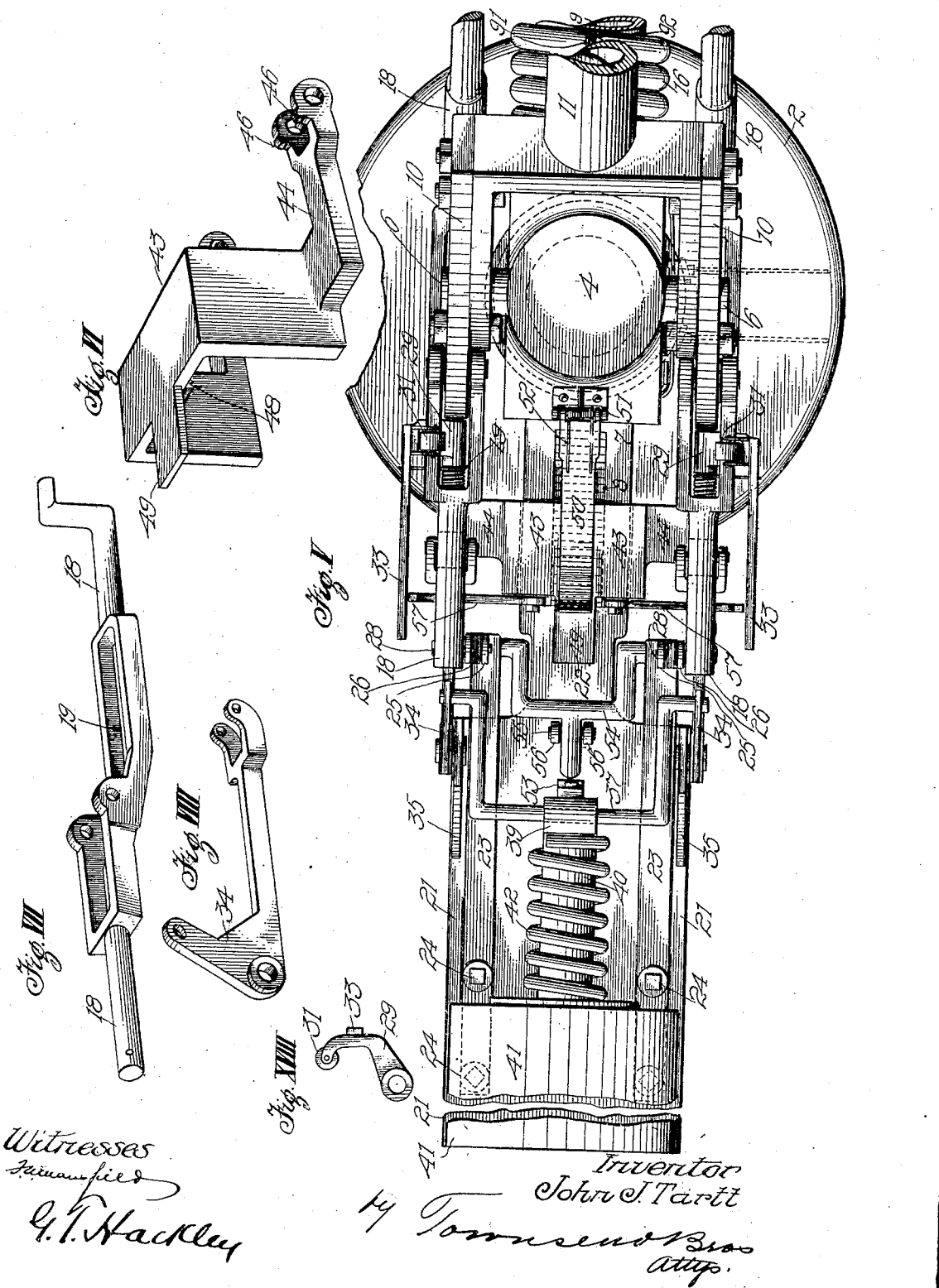

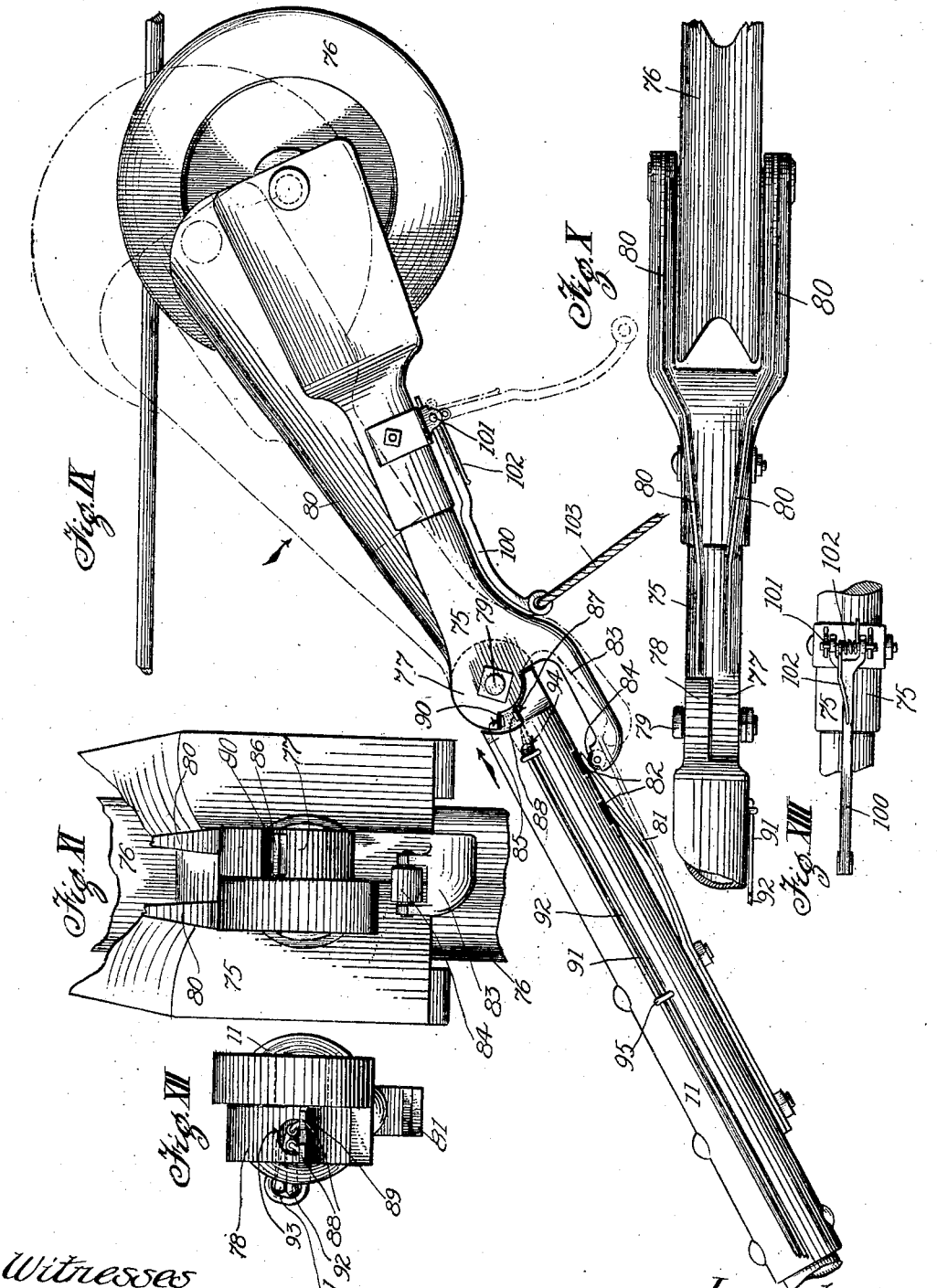

UNITED STATES PATENT OFFICE.

JOHN J. TARTT, OF LOS ANGELES, CALIFORNIA, ASSIGNOR OF ONE-HALF TO DAVID E. SPANGLER, OF LOS ANGELES, CALIFORNIA.

TROLLEY-POLE CONTROLLER.

No. 830,686.    Specification of Letters Patent.    Patented Sept. 11, 1906.

Application filed December 28, 1903. Serial No. 186,833.

*To all whom it may concern:*

Be it known that I, JOHN J. TARTT, a citizen of the United States, residing at Los Angeles, in the county of Los Angeles and State of California, have invented a new and useful Trolley-Pole Controller, of which the following is a specification.

This invention relates to a device for preventing upward movement of the trolley-pole when the trolley jumps from the trolley-wire and for causing the trolley-pole to lower automatically to prevent damage caused by striking of the trolley against span-wires, bridges, or other overhead structures.

In my invention the trolley-pole is held against the wire by the usual compression-spring. This is a strong spring and pulls with a comparatively short leverage from the fulcrum of the trolley-pole, and the generic feature of my invention is to automatically decrease or render this leverage *nil* when the trolley leaves the wire, so that the trolley-pole will fall by gravity. This reduction or nullification of leverage is accomplished by a mechanism which is initially controlled by a trolley-carrier at the upper end of the trolley-pole. By a "trolley-carrier" I refer to a short arm which is pivoted to the trolley-pole proper, which carries the trolley and which is automatically flexed relatively to the trolley-pole when the trolley leaves the wire.

The mechanism initially controlled by the trolley-carrier is immediately actuated by a magnetic device which is normally dead so long as the trolley is on the wire. When the trolley flies from the wire, the trolley-carrier operates a switch which closes a circuit through the magnetic device, thus energizing the magnetic device and operating the attendant train of mechanism.

The object of the invention is to provide a device of the character above described which will be automatic and effective in operation and durable in use.

Another object is to enable the trolley-pole to be readily replaced, with the trolley resting against the wire, by manipulation of the trolley-rope.

Other objects and advantages of the invention will appear from the following description.

The accompanying drawings illustrate the invention.

Referring to the drawings, Figure I is a side elevation of the complete device, showing the trolley against the wire. Fig. II is a side elevation, enlarged, of the mechanism at the lower end of the trolley-pole. Parts of the main spring and trolley-pole are broken away. The view shows the parts in position when the trolley-pole is elevated. Fig. III is a view similar to Fig. II, showing the parts in position when the trolley-pole is depressed. Fig. IV is a section on line IV IV of Fig. III. Fig. V is a plan view of what is shown in Fig. II. Fig. VI is a detail in perspective of the locking-yoke. Fig. VII is a detail in perspective of the front end of a reach-rod. Fig. VIII is a detail in perspective of a reach-rod shifter. Fig. IX is a side elevation of the upper end of the trolley-pole, showing the trolley-carrier. Fig. X is a view looking at the trolley-carrier in the direction of the arrow, Fig. IX. Fig. XI is a view looking toward the lower end of the trolley-carrier, the trolley-pole being removed. The view is taken looking in the direction of the arrow which is shown adjacent the pivot. Fig. XII is a view looking toward the upper end of the trolley-pole with the trolley-carrier removed and looking in a direction the reverse of the arrow which is shown adjacent the pivot. Fig. XIII is a view looking toward the under side of the trolley-carrier, showing the trolley-rope-attaching device. Fig. XIV is a sectional view through the base-socket, showing the conducting-rings. Fig. XV is a perspective of the swivel-pin and the table supported thereby. Fig. XVI is a perspective of the saddle-supporting yoke. Fig. XVII is a perspective of a trip-lever. Fig. XVIII is a side elevation of a locking-detent.

1 designates the roof of a car upon which is mounted a base 2, having a depending tubular extension forming a socket 3.

4 is a swivel-pin which is revolubly mounted within the socket 3, having a shoulder 5, which rests upon the upper body of the base 2. The pin 4 extends above the base 2 and for a portion of its length is rectangular in cross-section, and at its upper end are trunnions 6. Projecting forwardly from the swivel-pin 4 is a head 7, the upper face of which is provided with teeth 8. Projecting rearwardly from the swivel-pin 4 is a spring-supporting bar 9, preferably formed of a pipe, as shown.

10 is a trolley-fork mounted on the trunnions 6 and carries the trolley-pole 11. Each leg of the trolley-fork 10 has a concave bearing-face 12.

13 and 14 designate hooks which project from each leg of the trolley-fork, the hooks having concave bearing-faces which merge with the bearing-face 12.

15 is a cross-bar slidably mounted on the spring-supporting bar 9, and a main spring 16 is interposed between the cross-bar 15 and the rear face of the swivel-pin 4.

17 represents reach-rods, which are connected at their rear ends to the cross-bar 15 and extend forward and carry offset extensions 18, formed as loops 19, the sides of which are beveled, as shown in Fig. VII, the legs of the trolley-fork extending freely through the respective loops 19. Mounted in each loop is an antifriction-roller 20, which is adapted to travel over the concave bearing-faces 12 and in normal position is supported by the bottom hook 13, as shown in Fig. II.

21 is a horizontal table which is joined to the head 7 by a neck 22.

23 represents flat springs fastened to the table 21 by bolts 24. The free end of each spring 23 has an ear 25, to which is pivoted a link 26. Each link 26 has a slot 27, and projecting inwardly from the forward end of each reach-rod is a pin 28, which lies within a slot 27.

Means for locking the reach-rods normally in position when engaging the lower part of the trolley-fork comprises a pair of locking-detents 29, pivoted to studs 30, which project forward from toes 13 of the trolley-fork. Each detent carries a roller 31 at its upper end which is normally held over the top of the outside bar of a loop 19 by means of a spring 32, each detent having arms 33, against which its spring 32 bears. When the reach-rods are unlocked, they are tilted upwardly by a pair of reach-rod shifters. Each reach-rod shifter comprises a bell-crank lever 34, pivoted to a standard 35, which projects up from the table 21, there being a standard 35 at each side of the table near the neck 22. Each reach-rod shifter has a concave roller 36 mounted in its forked end, which bears against the under side of the forward end of each reach-rod forward of its loop 19. The upper arm of each reach-rod shifter is connected to a bail 37. The hole in the reach-rod shifter which receives the end 38 of the bail is slightly elongated, as shown in Figs. II and III, in order to allow a slight movement of the bail before tilting the reach-rod shifter 34, for a purpose described hereinafter. The bail 37 is carried by an arm 39, which projects from the protruding end of an armature 40 of a solenoid 41. The solenoid 41 is mounted on the table 21, there being a compression-spring 42 between the solenoid and arm 39 for holding the armature extended, as shown in Fig. II.

43 is a locking-saddle pivoted to the trolley-fork, having arms 44, each of which is forked and connected to the lower part of a leg of the trolley-fork 10 by a pin 45. The hubs of the fork of each arm 44 are provided with lugs 46, which stand behind pins 47, which project from opposite sides of each leg of the trolley-fork 10. The saddle 43 straddles the head 7, and its top inner face is provided with teeth 48, which are adapted to engage the teeth 8 of the head 7 when the saddle 43 is dropped slightly. The upper part of the saddle has an extending shelf 49. An arm 50, pivoted at 51 to the swivel-pin 4, is pressed against the top of the locking-saddle 43 by a spring 52. Projecting downwardly from the armature 40 is a plate 53.

54 is a saddle-supporting yoke, which is pivoted at 55 to standards 56, which project from the table 21. The saddle-supporting yoke 54 has an arm 56', which stands close to the plate 53, the free ends of the yoke 54 extending rearwardly and lying directly under the arms 44 of the locking-saddle 43, as shown in Figs. II, III, and V.

A pair of trip-levers 57 (for detail see Fig. XVII) are laterally pivoted at 58 to the front face of the head 7. (See Figs. IV and V.) Each trip-lever extends up inside of its adjacent detent-arm 33, its lower bar crossing under the adjacent leg of the saddle-supporting yoke 54.

60 is an annular ring of insulating material fastened to the base 2 concentric with the socket 3, having an internal bore slightly larger than the adjacent part of the pin 4 to prevent friction between the pin and insulation. The insulating-ring 60 has two annular grooves which receive conducting-rings 61 and 62, (see Fig. XIV,) and wires 65 and 66 lead from the respective conducting-rings 61 and 62 to a battery 67, which may be located at any convenient place on the car.

68 and 69 are contact-blades which are adapted to sweep around the respective conducting-rings 61 and 62, the contact-blades being carried by the swivel-pin 4 and being insulated therefrom by fiber blocks 70. The contact-blades 68 and 69 sweep around the conducting-rings 61 and 62 when the trolley-pole pin 4 and attached parts are swiveled in the socket 3.

75 designates a trolley-carrier, which is forked at its upper end to receive the trolley 76. The shank of the trolley-carrier 75 is provided with a knuckle 77, which laps over a similar knuckle 78 on the end of the trolley-pole 11, there being a bolt 79, which joins the two knuckles together.

80 designates a pair of relatively thin walls which project from the upper side of the trolley-carrier 75 and which form guards to prevent a span-wire or other overhead structural element catching in the notch formed by the trolley and trolley-carrier. The extreme upper end of the walls 80 are curved, as shown in Fig. IX, so as to ease the passage of the trolley-carrier under a span-wire or other overhead structural element against which it may strike accidentally. The walls 80 are tapering and at their lower end merge with the shank of the trolley-carrier.

When the trolley is on the wire, the upward pressure of the trolley-pole 11 flexes the trolley-carrier downwardly, as shown in Fig. IX. When the trolley flies off from the wire, it is tilted upwardly into the position shown in dotted lines in Fig. IX by means of a flat spring 81, preferably formed of two members, to secure the requisite strength with maximum resiliency. The spring 81 is bolted to the under side of the trolley-pole, as shown, and in order to prevent any passage of electric current through the spring which would destroy its usefulness the free ends of the spring preferably rest against the insulation 82 inlaid in the pole. The trolley-carrier has an arm 83, which carries a small antifriction-roller 84, which bears against the spring 81.

The knuckle 77 of the trolley-carrier is provided with a shoulder 85, upon which is mounted a contact 86. The knuckle 78 of the trolley-pole is provided with a shoulder 87. A pair of contact-blocks 88 are mounted upon the shoulder 87, there being insulation 89 between the contact-blocks 88 and the shoulder. Insulation 90 is also provided between the shoulder 85 and contact-blocks 86. Wires 91 and 92 are connected to the respective contact-blocks 88, pass through the hole 93 in the knuckle 78 to the interior of the trolley-pole, thence out through a hole 94, and down the side of the trolley-pole, as shown, being confined in place by staples 95. The wire 91 leads down the trolley-pole and is attached to the contact-blade 68, while the wire 92 leads down the trolley-pole and crosses the swivel-pin 4 and is carried under the table 21 to one pole of the solenoid 41. The other pole of the solenoid 41 is connected by a wire 96 with the cable-terminal 69, both wires 92 and 96 being carried underneath the table 21 and held in place by staples 97. Thus an open circuit is formed as follows: from battery 67 wire 65 leads to ring 61, through contact-blade 68 to wire 91, through wire 91 to one of the contact-blocks 88, and from the other contact-block 88 through wire 92 to the solenoid 41, through the solenoid to wire 96, to contact-blade 69, thence to conducting-ring 62, thence through wire 66 to battery 67.

100 is a guide-rope carrier, (see Figs. IX and XIII,) which has a forked end pivoted to a clip 101, the clip 101 being fastened to the harp of the trolley-carrier, as shown. A spring 102 is coiled around the pivot of the guide-rope carrier, and one leg of the spring 102 bears against the clip 101 and the other leg bears against the under side of the guide-rope carrier 100, so that the guide-rope carrier is normally held close against the under side of the trolley-carrier, as shown. The end of the guide-rope carrier 100 has an eye for the attachment of the guide-rope 103. The eye of the guide-rope carrier 100 lies comparatively close to the pivot 79 of the trolley-carrier, so that the weight of the guide-rope does not interfere with the free action of the trolley-carrier. If the guide-rope 103 were attached at a point farther removed from the pivot, its pulling weight would be so great that the spring 81 would need to be very stiff in order to balance it, and the action of the trolley-carrier when moving upwardly would be very sluggish, and it is important that the trolley-carrier be tilted upwardly with the greatest speed as soon as the trolley jumps from the wire. The spring 102 is sufficiently strong to support the weight of the guide-rope and hold the eye of the guide-rope carrier close to the fulcrum of the trolley-carrier and close against the trolley-carrier. When the guide-rope 103 is pulled upon, the guide-rope carrier 100 is drawn into the position shown in dotted lines in Fig. IX, so that a sufficient leverage is secured to overcome the tension of the spring 81 and flex the trolley-carrier into the same position which it would have were the trolly against the wire. This is important, as it is advantageous to break the circuit and deënergize the solenoid 41 to enable ready handling of the trolley-pole by the manipulation of the guide-rope alone.

The parts normally have their positions shown in Figs. I and II when the trolley is on the wire. When the trolley flies off the wire, the spring 81 tilts the trolley-carrier upwardly into the position shown in dotted lines in Fig. IX, and the contact-strip 86 is brought against the contact-blocks 88, bridging them across, which closes the circuit through the solenoid 41, whereupon the solenoid is energized and draws the armature 40 forward. As the armature 40 moves forward the saddle-supporting yoke 54 tilts downwardly by gravity into the position shown in Fig. III. The legs of the saddle-supporting yoke strike against the lower bars of the trip-levers 57 and tilt the trip-levers outwardly into the position shown in Fig. IV. As the trip-levers 57 move outwardly they strike the detent-arms 53 and rock both detents 29 outwardly. The detent-rollers 31 permit an easy outward movement of the detents and readily roll off from the top of the bars of the loops 19. The first slight movement of the armature 40 accomplishes the foregoing function just described, and as soon as the detents 29 have freed the reach-rods the bail 37 will have reached the limit of its slight free movement in the elongated slot 38, at which time the reach-rod shifters are tilted upwardly through the medium of the bail 37 due to the forward movement of the armature 40, and as the reach-rod shifters are tilted upwardly their concave rollers 36, bearing against the under side of each reach-rod, shift the reach-rods upwardly into the position shown in Fig. III, the rollers 20 both freely riding upon the concave bearing-faces 12 until they reach the hooks 14, which limits their upward movement, and when the reach-rods have been thus shifted their leverage upon the trolley-fork is *nil*, as they lie directly behind the trunnions 6 directly in line with the point of their attachment to the cross-bar 15. The early part of the upward movement of the reach-rod moves the pins 28 freely up through the slots 27 in the links 26; but as soon as the pins 28 have been brought to the top of the slots the spring 23 is flexed into the position shown in Fig. III. Simultaneously with the upward shifting of the reach-rods the trolley-pole 11 commences to fall by gravity, although the movement of the reach-rods into their shifted position will occur before the trolley-pole has fully dropped. Therefore although the concave bearing-faces 12 move forward as the pole drops the rollers 20 will have moved upwardly so quickly that no appreciable longitudinal movement of the reach-rods will be caused.

When the saddle-supporting yoke drops, the locking-saddle 43 also drops, being assisted by the spring 50, and the teeth 48 are brought into engagement with the teeth 8, so that the trolley-fork 10 is locked from further movement upward. The engagement of the saddle-teeth 48 with the teeth 8 is but momentary, occurring just before the upward shifting of the reach-rods, and the movement which the locking-saddle makes, while slight, is sufficient to bring its teeth into engagement with the teeth 8. Thus the trolley-pole is prevented from further upward movement as soon as it flies from the wire. Thus movement of the locking-saddle 48 is downward and has a slight rocking motion due to the swinging of the pivots 45 downward. This movement is immediately followed by a reversal caused by the tilting of the trolley-fork on the trunnions 6 when the pole drops, which movement raises the saddle 48 bodily by reason of the pins 47 standing in front of the lugs 46.

When the pole has dropped, the parts assume the position shown in Fig. III and maintain that position so long as the trolley-carrier 75 is flexed, as shown in dotted lines in Fig. IX, and the circuit through the solenoid 41 is closed. As soon, however, as the guide-rope 103 is pulled upon the guide-rope carrier 100 is drawn down into the position shown in dotted lines in Fig. IX, and sufficient leverage is thus secured upon the trolley-carrier to draw back the trolley-carrier into its normal position relative to the trolley-pole, which breaks the switch at the joint of the trolley-carrier and deënergizes the solenoid 41, at which time the spring 42 expands and retracts the armature 40, which restores the reach-rod shifters 34, and the springs 23 pull down the reach-rods through the medium of the links 26. The links 26 obviously do not pull the reach-rods into their extreme lower position, owing to the slotted construction of the links; but as soon as the reach-rods have been shifted an appreciable distance below the trunnions 6—that is to say, over the dead-center—the main spring 16 immediately takes effect, as the leverage of the reach-rods against the trolley-fork at such time is again restored sufficiently to enable the main spring 16 to fully restore the reach-rods to their lowered position, the rollers 20 riding down the concave faces 12.

It will be observed that the middle part of the concave face 12 veers to the rear from the rollers 20 when the parts are in the position shown in Fig. II, and it might be thought that while the spring 23 would pull the reach-rods to the most rearward point of the concave face 12, owing to the forward curvature of the bearing-face below that point, the main spring would not tend to pull the reach-rods into the lowered positions with the rollers 20 lying against the hooks 13; but in Fig. II the trolley-pole has been shown quite low, and it will readily be seen that when the trolley-pole has a somewhat higher elevation the trolley-fork will stand more to the rear, so that the roller 20 will roll against the hook 13, and in doing so will have a path of travel along the least resistance. As soon as the reach-rods have been brought to their lowest position the detents 29 spring over the top bars of the loops 19 and lock the reach-rods in that position, the beveled sides of the loop 19 assisting the easy passage of the loops over the rollers 31. As the detents 29 spring inwardly they tilt the trip-levers 57 inwardly with them, the latter offering no opposition except their weight, as they have no opposition to this movement by the saddle-supporting yoke, the latter having been tilted upwardly at the outward movement of the armature 40. As the car moves along the trolley-pole plays up and down, owing to the varying elevation of the trolley-wire, and the reach-rods are advanced or retracted, according to the relative movement of the trolley-fork; but the reach-rods are always held with the rollers against the hooks 13 by the detents 29, except of course at such times as the detents have been released through the operation of the mechanism when the trolley flies from the wire. During this normal up-and-down movement of the trolley-pole it is obvious that there will be a slight tilting of the loops 19 relative to the detents 29; but this movement is slight, and the detents are held securely in place over the loops, so that the reach-rods cannot move upwardly even though they have a tendency to do so when the pole has been depressed low enough to bring the rollers 20 in advance of a portion of the concave bearing-faces 12.

While I have shown and described the preferred embodiment of my invention, it should be understood that various modifications may be made without departing from the spirit thereof.

What I claim is—

1. A pivoted trolley-pole, means for supporting the pole, a magnetic device for controlling the supporting means, a trolley-carrier on the trolley-pole, and means controlled by the trolley-carrier for controlling the magnetic device.

2. A pivoted trolley-pole, means for supporting the pole, a trolley-carrier on the trolley-pole, a magnetic device for controlling the supporting means, and means operated by the trolley-carrier for controlling the magnetic device.

3. A pivoted trolley-pole, supporting means engaging the same at one side of the pivotal point, and a magnetic device for shifting the point of attachment of the supporting means toward the pivotal point.

4. A pivoted trolley-pole, supporting means engaging the same at one side of the pivotal point, a magnetic device for shifting the point of attachment of the supporting means toward the pivotal point, a trolley-carrier on the trolley-pole, and means operated by the trolley-carrier for controlling the magnetic device.

5. In combination, a pivoted trolley-pole, reach-rods for supporting the same, a solenoid, and means intermediate the solenoid and reach-rods for shifting the reach-rods when the solenoid-armature moves.

6. In combination, a swivel-pin, a table carried thereby, a trolley-pole pivoted to the swivel-pin, a solenoid on the table, reach-rods for supporting the trolley-pole, pivoted reach-rod shifters for the respective reach-rods, and means for connecting the reach-rod shifters with the solenoid.

7. In combination, a swivel-pin, a table carried thereby, a trolley-pole pivoted to the swivel-pin, reach-rods for supporting the trolley-pole, and means for shifting the reach-rods toward the pivotal point of the trolley-pole comprising a pair of pivoted reach-rod shifters for the respective reach-rods, a bail connected to the reach-rod shifters, and a solenoid on the table, the armature of the solenoid being connected to the bail.

8. In combination, a swivel-pin, a trolley-fork pivoted thereto, a trolley-pole on the trolley-fork, reach-rods adjustably engaging the trolley-fork, a pair of pivoted reach-rod shifters, each reach-rod shifter comprising a bell-crank lever and an antifriction-roller on one arm of the lever bearing against a reach rod, a solenoid on the table, a bail connecting the two reach-rod shifters, said bail being connected to the armature of the solenoid.

9. In combination, a base having a socket, a swivel-pin mounted in the socket, trunnions on the swivel-pin, a trolley-fork on the trunnions, the two legs of the fork having concave bearing-faces, a pair of reach-rods, rollers mounted in each reach-rod and bearing against the respective contact-faces, a main spring connected with the reach-rods, and means for shifting the reach-rods and moving the rollers back of the trunnions.

10. In combination, a base having a socket, a swivel-pin in the socket, trunnions on the swivel-pin, a trolley-fork on the trunnions, the two legs of the fork having concave bearing-faces, reach-rods, a roller mounted in each reach-rod and bearing against a concave bearing-face, a main spring connected with the reach-rods, and means for locking said reach-rods in a definite position on the trolley-fork.

11. In combination, a base having a socket, a swivel-pin in the socket, trunnions on the swivel-pin, a trolley-fork on the trunnions, the two legs of the fork having concave bearing-faces, reach-rods, a roller mounted in each reach-rod and bearing against the respective concave bearing-faces, a main spring connected with the reach-rods, means for locking said reach-rods in a definite position on the trolley-fork, and means for automatically unlocking said reach-rods.

12. A base having a socket, a swivel-pin in the socket, a trolley-fork pivoted to the swivel-pin, a spring-support on the swivel-pin, a main spring on the support, a cross-bar on the support bearing against the spring, reach-rods connected to the cross-bar, the trolley-fork having bearing-faces, rollers in the reach-rods adapted to ride over the bearing-faces, means for locking the reach-rods in a definite position with respect to the trolley-fork, mechanism for unlocking said reach-rods, and a magnetic device for controlling said mechanism.

13. A base having a socket, a swivel-pin in the socket, a trolley-fork pivoted to the swivel-pin, a spring-support on the swivel-pin, a main spring on the support, a cross-bar on the support bearing against the spring, reach-rods connected to the cross-bar, the trolley-fork having bearing-faces, rollers in the reach-rods adapted to ride over the bearing-faces, means for locking the reach-rods in a definite position with respect to the trolley-fork, mechanism for unlocking said reach-rods, a magnetic device for controlling said mechanism, a trolley-pole on the trolley-fork, a trolley-carrier on the trolley-pole, and means operated by the trolley-carrier for controlling the magnetic device.

14. A base having a socket, a swivel-pin in the socket, a trolley-pole pivoted to the swivel-pin, means for supporting the trolley-pole, a magnetic device for controlling said means, and means for locking said supporting means in a definite position relatively to the trolley-pole.

15. A base having a socket, a swivel-pin in the socket, a trolley-pole pivoted to the swivel-pin, means for supporting the trolley-pole, a magnetic device for controlling said means, means for locking said supporting means in a definite position relatively to the trolley-pole, and means for unlocking said supporting means.

16. A base having a socket, a swivel-pin in the socket, a trolley-pole pivoted to the swivel-pin, means for supporting the trolley-pole, means for locking said supporting means in a definite position relatively to the trolley-pole, means for unlocking said supporting means, mechanism for operating said locking means, and a magnetic device for controlling said mechanism.

17. A base having a socket, a swivel-pin in the socket, a trolley-pole pivoted to the swivel-pin, means for supporting the trolley-pole, a magnetic device for controlling said means, means for locking said supporting means in a definite position relatively to the trolley-pole, means for unlocking said supporting means, mechanism for operating said locking means, a trolley-carrier pivoted to the trolley-pole, and means operated by the trolley-carrier for controlling the magnetic device.

18. In combination, a trolley-pole, a trolley-carrier pivoted to the trolley-pole, means for supporting the trolley-pole, a magnetic device for controlling said means, a switch controlled by the trolley-carrier, and an electric circuit embracing the magnetic device and switch.

19. A trolley-pole, a trolley-carrier pivoted thereto, a pair of contacts on the trolley-pole, a contact on the trolley-carrier adapted to bridge the first-named contacts, and a flat spring on the trolley-pole bearing against the trolley-carrier.

20. A trolley-pole, a trolley-carrier pivoted thereto, and means for attaching a guide-rope to the trolley-carrier comprising an arm pivoted to the carrier, and means for yieldingly holding the free end of said arm normally relatively close to the pivotal point of the trolley-carrier.

21. A trolley-pole, a trolley-carrier pivoted thereto, a guide-rope carrier pivoted to the trolley-carrier at a point removed from the pivotal point of the trolley-carrier, and a spring for holding the guide-rope carrier close to the trolley-carrier with the free end of the guide-rope carrier relatively close to the pivotal point of the trolley-carrier.

22. A trolley-pole having a knuckle, a trolley-carrier having a knuckle lapped over the first knuckle, a bolt joining the knuckles, each knuckle having a shoulder, a pair of contacts insulated from one knuckle, and a single contact insulated from the other knuckle adapted to bridge the first-named contacts.

23. In combination, a base having a socket, a swivel-pin mounted in the socket, an annular ring of insulating material on the base, conducting-rings in the annular ring, a pair of contact-blades carried by the swivel-pin and adapted to sweep over the respective conducting-rings, a trolley-pole pivoted to the swivel-pin, mechanism for controlling the pole mounted on the swivel-pin, an electric generator connected to the conducting-rings, the respective contact-blades being electrically connected with the means for controlling the trolley-pole.

24. A pivoted trolley-pole, means for normally supporting the pole, means for locking the supporting means, and means including a magnetic device for automatically unlocking the supporting means.

25. A pivoted trolley-pole, means for normally supporting the pole, means for normally locking the supporting means, means including a magnetic device for automatically unlocking the supporting means and allowing the pole to drop, and means for raising the pole.

26. A pivoted trolley-pole, means for resiliently supporting the trolley-pole, means for normally locking the supporting means, and means including a magnetic device for automatically nullifying the effective agency of the supporting means and allowing the pole to drop.

27. A pivoted trolley-pole, means for resiliently supporting the trolley-pole, means for normally locking the supporting means, means including a magnetic device for automatically nullifying the effective agency of the supporting means and allowing the pole to drop, and means for raising the pole.

28. A pivoted trolley-pole, means for resiliently supporting the trolley-pole, means for normally locking the said supporting means, a magnetic device for controlling said locking means, means for automatically controlling said magnetic means, and means for nullifying the effective agency of the supporting means and allowing the pole to drop when the supporting means is unlocked.

29. A pivoted trolley-pole, means for resiliently supporting the trolley-pole, means for normally locking the said supporting means, a magnetic device for controlling said locking means, means for automatically controlling said magnetic means, means for nullifying the effective agency of the supporting means and allowing the pole to drop when the supporting means is unlocked, and means for raising the pole.

30. A pivoted trolley-pole, reach-rods connected thereto, a main spring connected to the reach-rods, means for shifting the reach-rods toward the pivot of the trolley-pole, mechanism for locking said reach-rods, means for unlocking said reach-rods and allowing the pole to drop, and means for raising said pole comprising a pair of flat springs and links connecting the springs and the reach-rods.

31. A pivoted trolley-pole, reach-rods connected thereto, a main spring connected to the reach-rods, means for shifting the reach-rods toward the pivot of the trolley-pole, mechanism for locking said reach-rods, means for unlocking said reach-rods and allowing the pole to drop, and means for raising said pole comprising a pair of flat springs, said springs having ears, pins projecting from the reach-rods, links pivoted to the ears, each link being slotted, the pins of the reach-rods projecting into the respective slots.

32. In combination, a base having a socket, a swivel-pin in the socket, a trolley-fork pivoted on the swivel-pin, a head carried by the swivel-pin, its upper face having teeth, a locking-saddle carried by the fork, said locking-saddle having teeth adapted to engage the teeth on the head.

33. In combination, a base having a socket, a swivel-pin on the base, a trolley-fork pivoted to the swivel-pin, a locking-saddle having forked arms which are pivoted to the legs of the trolley-fork, means for limiting the movement of the locking-saddle relatively to the trolley-fork, a head carried by the swivel-pin, its upper face having teeth, the inner top face of the locking-saddle having teeth adapted to engage the teeth on the head.

34. In combination, a base having a socket, a swivel-pin on the base, a trolley-fork pivoted to the swivel-pin, a locking-saddle having forked arms, the fork on each arm straddling its respective leg of the trolley-fork, a head carried by the swivel-pin having teeth, said locking-saddle straddling said head, means on said head adapted to clutch the locking-saddle, and means for limiting the movement of the locking-saddle relatively to the trolley-fork.

35. In combination, a base having a socket, a swivel-pin on the base, a trolley-fork pivoted to the swivel-pin, a locking-saddle having forked arms, the fork on each arm straddling its respective leg of the trolley-fork, a head carried by the swivel-pin having teeth, said locking-saddle straddling said head, means on said head adapted to clutch the locking-saddle, a pin projecting from a leg of the trolley-fork, and a lug on an arm of the locking-saddle adapted to engage said pin.

36. In combination, a base having a socket, a swivel-pin on the base, a trolley-fork pivoted to the swivel-pin, said trolley-fork having bearing-faces, reach-rods, rollers mounted in the reach-rods and bearing against the bearing-faces, a main spring connected to the reach-rods, studs projecting from the legs of the trolley-fork, locking-detents on the studs adapted to engage the reach-rods.

37. In combination, a base having a socket, a swivel-pin on the base, a trolley-fork pivoted to the swivel-pin, said trolley-fork having bearing-faces, reach-rods, rollers mounted in the reach-rods and bearing against the bearing-faces, a main spring connected to the reach-rods, studs projecting from the legs of the trolley-fork, locking-detents on the studs adapted to engage the reach-rods, and means for yieldingly holding said locking-detents over the reach-rods.

38. In combination, a base having a socket, a swivel-pin on the base, a trolley-fork pivoted to the swivel-pin, said trolley-fork having bearing-faces, reach-rods, rollers mounted on the reach-rods bearing against the bearing-faces, a main spring connected to the reach-rods, studs projecting from the legs of the trolley-fork, locking-detents on the studs, rollers on the locking-detents, arms projecting from the locking-detents, and coil-springs on the studs engaging the arms of the locking detents for normally holding the detent-rollers over the reach-rods.

39. In combination, a base having a socket, a swivel-pin on the base, a trolley-fork pivoted to the swivel-pin, said trolley-fork having bearing-faces, reach-rods, rollers mounted on the reach-rods bearing against the bearing-faces, a main spring connected to the reach-rods, studs projecting from the legs of the trolley-fork, locking-detents on the studs, rollers on the locking-detents, arms projecting from the locking-detents, coil-springs on the studs engaging the arms of the locking-detents for normally holding the detent-rollers over the reach-rods, a head carried by the swivel-pin, a locking-saddle pivoted to the trolley-fork, means on said head for clutching the locking-saddle, and means for limiting the movement of the locking-saddle relatively to the trolley-fork.

40. In combination, a base having a socket, a swivel-pin on the base, a trolley-fork pivoted to the swivel-pin, reach-rods, rollers on the reach-rods bearing against the trolley-fork, hooks on the trolley-fork for limiting the movement of the reach-rods, locking-detents pivoted to the legs of the trolley-fork, arms projecting from the locking-detents, a head carried by the swivel-pin, trip-levers pivoted to said head and engaging said detent-arms, and means for actuating said trip-levers and tilting said detents and releasing said reach-rods.

41. In combination, a base having a socket, a swivel-pin on the base, a trolley-fork pivoted to the swivel-pin, reach-rods, rollers on the reach-rods bearing against the trolley-fork, hooks on the trolley-fork for limiting the movement of the reach-rods, locking detents pivoted to the legs of the trolley-fork, arms projecting from the locking-detents, a head carried by the swivel-pin, trip-levers pivoted to said head and engaging said detent-arms, means for actuating said trip-levers and tilting said detents and releasing said reach-rods, a locking-saddle pivoted to the trolley-fork, and means on said head adapted to clutch the locking-saddle.

42. In combination, a base having a socket, a swivel-pin on the base, a trolley-fork pivoted to the swivel-pin, reach-rods, rollers on the reach-rods bearing against the trolley-fork, hooks on the trolley-fork for limiting the movement of the reach-rods, locking-detents pivoted to the legs of the trolley-fork, arms projecting from the locking-detents, a head carried by the swivel-pin, trip-levers pivoted to said head and engaging said detent-arms, means for actuating said trip-levers and tilting said detents and releasing said reach-rods, a locking-saddle pivoted to the trolley-fork, means on said head adapted to clutch the locking-saddle, means for limiting the movement of the locking-saddle on the trolley-fork, an arm pivoted to the swivel-pin and bearing against the locking-saddle, and a spring for depressing said arm.

43. In combination, a base having a socket, a swivel-pin on the base, a trolley-fork pivoted to the swivel-pin, reach-rods engaging the trolley-fork, a main spring connected to the reach-rods, locking-detents pivoted to the trolley-fork and detachably engaging the reach-rods, arms projecting from the detents, a head carried by the swivel-pin, trip-levers pivoted to said head and engaging the detent-arms, a table carried by said head, a yoke pivoted to said table and engaging said trip-levers, and means for normally supporting said yoke.

44. In combination, a base having a socket, a swivel-pin on the base, a trolley-fork pivoted to the swivel-pin, reach-rods engaging the trolley-fork, a main spring connected to the reach-rods, locking-detents pivoted to the trolley-fork and detachably engaging the reach-rods, arms projecting from the detents, a head carried by the swivel-pin, trip-levers pivoted to said head and engaging the detent-arms, a table carried by said head, a yoke pivoted to said table and engaging said trip-levers, means for normally supporting said yoke, a solenoid on the table, an armature therefor, and a plate carried by the armature and bearing against an arm projecting from said yoke.

45. In combination, a base having a socket, a swivel-pin on the base, a trolley-fork pivoted to the swivel-pin, reach-rods engaging the trolley-fork, a main spring connected to the reach-rods, locking-detents pivoted to the trolley-fork and detachably engaging the reach-rods, arms projecting from the detents, a head carried by the swivel-pin, trip-levers pivoted to said head and engaging the detent-arms, a table carried by said head, a yoke pivoted to said table and engaging said trip-levers, means for normally supporting said yoke, a solenoid on the table, an armature therefor, a plate carried by the armature and bearing against an arm projecting from said yoke, a pair of flat springs on the table, and links connecting the springs and reach-rods.

46. In combination, a base having a socket, a swivel-pin on the base, a trolley-fork pivoted to the swivel-pin, reach-rods engaging the trolley-fork, a main spring connected to the reach-rods, locking-detents pivoted to the trolley-fork and detachably engaging the reach-rods, arms projecting from the detents, a head carried by the swivel-pin, trip-levers pivoted to said head and engaging the detent-arms, a table carried by said head, a yoke pivoted to said table engaging said trip-levers, means for normally supporting said yoke, a solenoid on the table, an armature therefor, a plate carried by the armature and bearing against an arm projecting from said yoke, a pair of flat springs on the table, links connecting the springs and reach-rods, standards on the table, reach-rod shifters pivoted to the standards, concave rollers on the reach-rod shifters engaging the reach-rods, a bail engaging the reach-rod shifters, and an arm projecting up from the armature of the solenoid and engaging said bail.

47. In a device of the character described, a table, standards thereon, a reach-rod shifter pivoted to a standard, a solenoid on the table, an armature therefor, a bail connected to the armature, said reach-rod shifter having elongated holes which receive the ends of said bail.

48. In combination, a base, a swivel-pin on the base, a trolley-fork pivoted to the swivel-pin, reach-rods engaging the trolley-fork, a main spring connected to the reach-rods, a head on the swivel-pin, a locking-saddle pivoted to the legs of the trolley-fork, means on the head for clutching the locking-saddle, a table supported by the head, a yoke pivoted on the table and extending under the saddle for normally supporting the same, a magnetic device on the table, and means intermediate the magnetic device and yoke for supporting the yoke.

49. In combination, a base, a swivel-pin on the base, a trolley-fork pivoted to the swivel-pin, reach-rods engaging the trolley-fork, a main spring connected to the reach-rods, a head on the swivel-pin, a locking-saddle pivoted to the legs of the trolley-fork, means on the head for clutching the locking-saddle, a table supported by the head, locking-detents pivoted to the trolley-fork and engaging the reach-rods, trip-levers pivoted to the head and engaging the locking-detents, a yoke pivoted on the table and extending under the locking-saddle and over the trip-levers, and means for normally supporting the yoke.

In testimony whereof I have hereunto signed my name, in the presence of two subscribing witnesses, at Los Angeles, in the county of Los Angeles and State of California, this 19th day of December, 1903.

JOHN J. TARTT.

Witnesses:
GEORGE T. HACKLEY,
JULIA TOWNSEND.